(12) United States Patent
Tanaka et al.

(10) Patent No.: US 11,668,411 B2
(45) Date of Patent: Jun. 6, 2023

(54) VALVE ABNORMALITY DETECTING DEVICE AND METHOD

(71) Applicant: Azbil Corporation, Tokyo (JP)

(72) Inventors: Masato Tanaka, Tokyo (JP); Fumiaki Yamasaki, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 374 days.

(21) Appl. No.: 16/940,967

(22) Filed: Jul. 28, 2020

(65) Prior Publication Data

US 2021/0033214 A1 Feb. 4, 2021

(30) Foreign Application Priority Data

Jul. 31, 2019 (JP) .............................. JP2019-140894

(51) Int. Cl.
*F16K 37/00* (2006.01)
*G05B 23/02* (2006.01)

(52) U.S. Cl.
CPC ...... *F16K 37/0083* (2013.01); *G05B 23/0235* (2013.01); *G05B 23/0262* (2013.01)

(58) Field of Classification Search
CPC .......................... F02D 41/004; F15B 2211/31; F15B 2211/41; F15B 2211/51; F15B 2013/0409; F16K 37/0083; F16K 37/00; F16K 37/0041; F16K 37/0066; F16K 31/0627; G16K 37/0025; G05B 23/0235; G05B 23/02; G05B 23/0205; G05B 23/0218; G05B 23/0224; G05B 23/0262; G05B 23/0227; G05B 2219/37333; G05B 2219/41301; Y10S 261/68; Y10T 137/2218; Y10T 137/2665; Y10T 137/776; Y10T 137/7361
See application file for complete search history.

(56) References Cited

U.S. PATENT DOCUMENTS

| | | | |
|---|---|---|---|
| 5,750,879 A | 5/1998 | Ohtsuka et al. | |
| 2008/0004836 A1* | 1/2008 | Tewes ................ | G05B 23/0221 |
| | | | 702/182 |

(Continued)

FOREIGN PATENT DOCUMENTS

| | | | | |
|---|---|---|---|---|
| JP | 3254624 B2 | 2/2002 | | |
| JP | 2013054483 A | * 3/2013 | ......... | F16K 37/0083 |
| JP | 2015-114942 A | 6/2015 | | |

(Continued)

*Primary Examiner* — Daniel R Miller
*Assistant Examiner* — Eric Sebastian Von Wald

(57) ABSTRACT

A valve abnormality detecting device includes an opening acquiring portion to acquire a valve opening value; a pressure acquiring portion to acquire a pressure value of operating device air of an operating device for a valve; a stability-time detecting portion configured to detect a stable-opening state in which the valve opening value acquired by the opening acquiring portion 1 is substantially constant; a frictional force detecting portion configured to detect a difference between a maximum pressure value and a minimum pressure value of the operating device air in the stable-opening state as an index value indicating a frictional force at a sliding portion of the valve; and an abnormality determining portion configured to determine that an abnormality may have occurred in the valve in a case where a frequency of occurrence of reduction in which the index value falls below a specified value is an abnormal frequency.

8 Claims, 10 Drawing Sheets

(56) References Cited

U.S. PATENT DOCUMENTS

2013/0110418 A1* 5/2013 Nousiainen ............... G01L 7/00
  702/50
2018/0113446 A1* 4/2018 Anderson .......... G05B 23/0208

FOREIGN PATENT DOCUMENTS

JP  2015-114943 A  6/2015
WO  WO-0239201 A1 *  5/2002  ............... G05B 5/01

* cited by examiner

VALVE ABNORMALITY DETECTING DEVICE AND METHOD

CROSS-REFERENCE TO RELATED APPLICATION

The present application claims the benefit of and priority to Japanese Patent Application No. 2019-140894, filed on Jul. 31, 2019, the entire contents of which are incorporated by reference herein.

TECHNICAL FIELD

The present invention relates to technology for detecting an abnormality of a valve.

BACKGROUND

Valves used in petrochemical plants (for example, a control valve illustrated in FIG. 11) need to be paid attention specifically in terms of safeness, and thus are subject to regular maintenance. The control valve illustrated in FIG. 11 includes a valve body 100 configured to open and close a passage in which a fluid flows, a positioner 101 configured to convert an input electrical signal to air pressure, and an operating device 102 configured to operate the valve body 100 according to air pressure supplied from the positioner 101.

In order to improve efficiency of maintenance work of the valve in plants where the valve as illustrated in FIG. 11 is installed, technology for detecting occurrence of stick-slip at a sliding portion of the valve (see PTL 1), technology for determining a hunting state of the valve (see PTL 2), and technology for detecting adherence of scales to the valve (see PTL 3) have been proposed.

The technology disclosed in PTLs 1 to 3 are methods realized in IoT (Internet of Things) platforms that operate big data such as cloud environments, and in some cases, such methods are based on the premise of data collection at week-to-week level.

There is no upper limit such as "perfect" or "sufficient" in safeness and work efficiency, and further improvement is always required in safety management. Especially, in the petrochemical plants, a plurality of valves 15-A, 15-C, and 15-M are used as illustrated in FIG. 12, for example. In particular, safety management requires swift action and needs are changing to valve fault detection at a timing closer to real-time, and thus further improvement is required.

CITATION LIST

Patent Literature

[PTL 1] Japanese Patent No. 3254624
[PTL 2] JP-A-2015-114942
[PTL 3] JP-A-2015-114943

SUMMARY

In order to solve the above-described problems, it is an object of the present invention to provide a valve abnormality detecting device and a method capable of detecting an abnormality of a valve at a timing closer to real-time than in the related art.

A valve abnormality detecting device according to the present invention comprises:

an opening acquiring portion configured to acquire a valve opening value;

a pressure acquiring portion configured to acquire a pressure value of operating device air supplied from a positioner to an operating device for the valve;

a stability-time detecting portion configured to detect a stable-opening state in which the valve opening value acquired by the opening acquiring portion is substantially constant;

a frictional force detecting portion configured to detect a difference between a maximum pressure value and a minimum pressure value of the operating device air in the stable-opening state as an index value indicating a frictional force at a sliding portion of the valve; and an abnormality determining portion configured to determine that an abnormality may have occurred in the valve in a case where a frequency of occurrence of reduction in which the index value falls below a specified value is an abnormal frequency.

In one configuration example of the valve abnormality detecting device of the present invention, the abnormality determining portion comprises:

a value lowering detecting portion configured to detect a remarkable lowering in which the index value lowers below the specified value;

a lowering time difference calculating portion configured, when a remarkable lowering of the index value is detected by the value lowering detecting portion, to calculate a time difference between a timing of occurrence of the remarkable lowering and a timing of occurrence of a previous remarkable lowering;

a lowering time difference storing portion configured to store the time difference calculated by the lowering time difference calculating portion; and a time difference determining portion configured to determine that an abnormality may have occurred in the valve in a case where an average value of a predetermined number of the time differences is smaller than a threshold.

In one configuration example of the valve abnormality detecting device of the present invention, the abnormality determining portion comprises:

a value lowering detecting portion configured to detect a remarkable lowering in which the index value lowers below the specified value;

a number of times of lowering counting portion configured to count a number of times of occurrence of the remarkable lowering of the index value; and a number of times determining portion configured to determine that an abnormality may have occurred in the valve in a case where the number of times of occurrence of the remarkable lowering of the index value in a prescribed time exceeds a threshold.

One configuration example of the valve abnormality detecting device of the present invention further comprises an abnormality occurrence notifying portion configured to notify an operator a fact that an abnormality may have occurred in the valve.

In addition, a valve abnormality detecting method according to the present invention comprises:

a first step of acquiring a valve opening value;

a second step of acquiring a pressure value of operating device air supplied from a positioner to an operating device for the valve;

a third step of detecting a stable-opening state in which the valve opening value acquired in the first step is substantially constant;

a fourth step of detecting a difference between a maximum pressure value and a minimum pressure value of the operating device air in the stable-opening state as an index value indicating a frictional force at a sliding portion of the valve; and a fifth step of determining that an abnormality may have occurred in the valve in a case where a frequency of occurrence of reduction in which the index value falls below a specified value is an abnormal frequency.

According to the present invention, with the provision of the opening acquiring portion, the pressure acquiring portion, the stability-time detecting portion, the frictional force detecting portion, and the abnormality determining portion, abnormality of the valve may be detected at a timing closer to real-time than in the related art.

DETAILED DESCRIPTION

Figure 1:
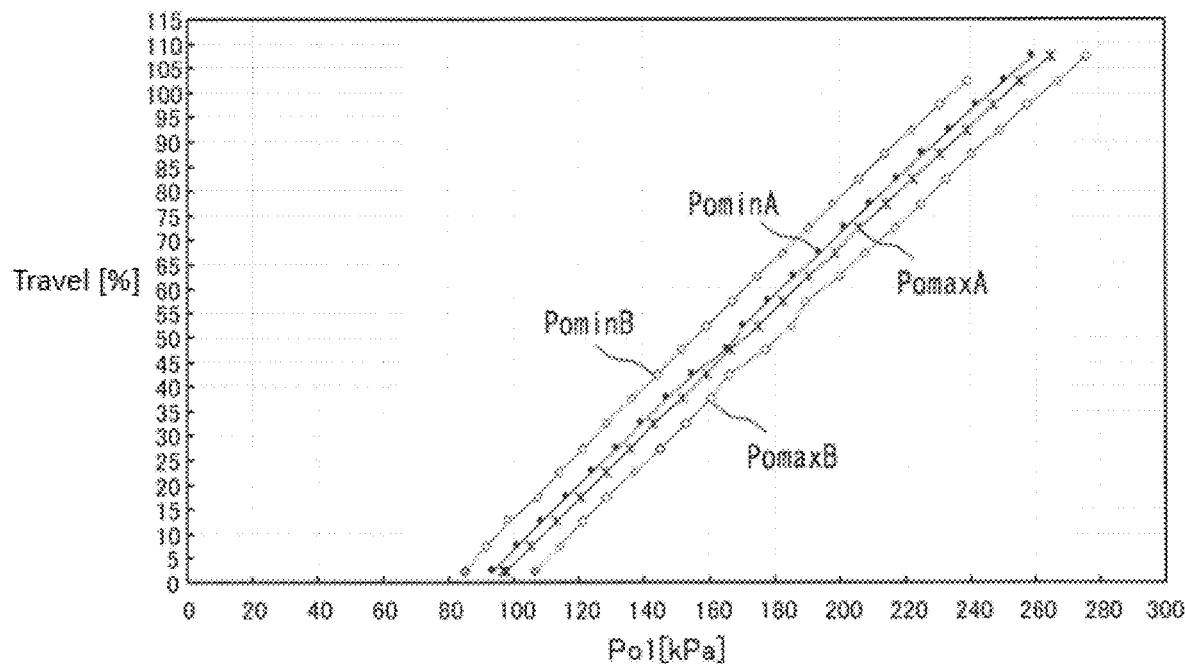
FIG. 1 is a drawing for explaining an index value of a frictional force at a sliding portion of a valve.

Regarding mounting of the valve, it is recognized that a Distributed Control System (DCS) input and actual opening can be captured without specific interconnection by an evolution of Highway Addressable Remote Transducer (HART) communication technology. In other words, deviation can be observed at a timing closer to real-time than the technology disclosed in PTL 1, and a sense of statistical data analysis is reduced. However, it is possible to target dynamics (dynamic characteristics or behavior characteristic in time series) for analysis.

As regards mounting of the valve, there is a case where a pressure sensor for air output from an operating device collects detections of a frictional force at a sliding portion of the valve when being submitted under a specific condition online at discrete points in time. More specifically, even when control to maintain a constant state at a constant opening is conducted, for example, as regards the frictional force, hysteresis included in fluctuation of the actual opening during the stability-time can be converted into a frictional force.

When a specific abnormal phenomenon (rapid fluctuation phenomenon) such as stick-slip occurs, probability of failure of detection of fluctuation in operating device air pressure is increased with a discrete time cycle taken into consideration, and abnormal lowering in converted value of frictional force occurs frequently.

As a result of the earnest research, the inventors have found that such frequent lowering of the value of frictional force can be treated as an abnormal phenomenon of the valve itself instead of being treated simply as abnormality in communication. In other words, the abnormal phenomenon of the valve can be detected while detecting the frictional force based on the fluctuation in operating device air pressure during the stability-time, and thus abnormality of the valve can be detected at a timing closer to real-time compared with those in the related art.

First Embodiment

Referring now to the drawings, a first embodiment of the present invention will be described. Detection of abnormality in the present invention is directed to an air-driven type valve connected to, for example, a DCS by communication.

[Frictional Force]

Examples of the index value of a frictional force at the sliding portion of a valve include a pressure difference between a pressure of air output from an operating device required for increasing an opening of the valve and a pressure of air output from the operating device required for reducing the valve opening at the same opening degree generated when these pressures are obtained according to the valve opening.

FIG. 1 is a drawing for explaining the index value of the frictional force, in which Po1 of the abscissa axis represents a pressure of air output from the operating device ("operating device air")(in kilopascals, kPa), and the vertical axis represents a travel of the valve (a percentage amount of movement of a valve body, %). PomaxA in FIG. 1 represents a maximum value of the pressure Po1 in a state in which the valve is normal, PominA represents a minimum value of the pressure Po1 in a state in which the valve is normal, PomaxB indicates the maximum value of the pressure Po1 in a state in which the frictional force of the valve is increased, PominB indicates the minimum value of the pressure Po1 in a state in which the frictional fore of the valve is increased. It is seen from FIG. 1 that the greater the frictional force, the greater the difference between Pomax and Pomin.

Figure 2:
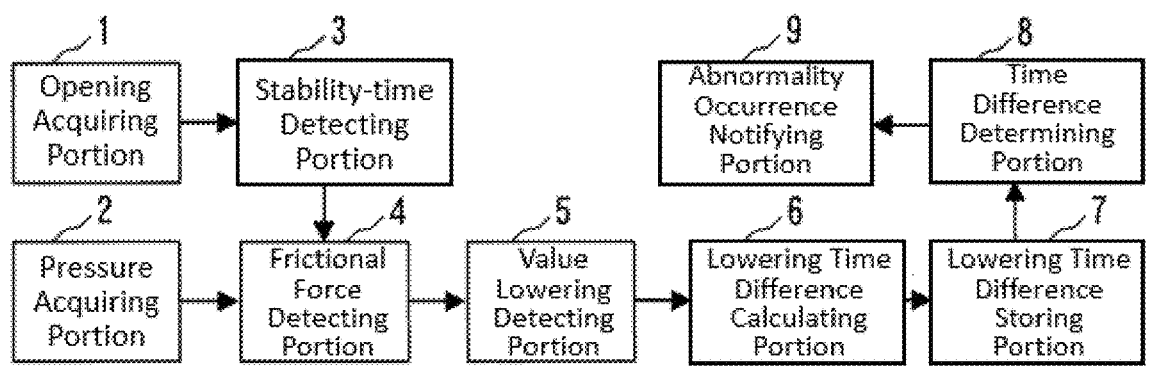
FIG. 2 is a block diagram illustrating a configuration of a valve abnormality detecting device according to a first embodiment of the present invention.

FIG. 2 is a block diagram illustrating a configuration of a valve abnormality detecting device according to the present embodiment. The valve abnormality detecting device comprises: an opening acquiring portion 1 configured to acquire a target valve opening value; a pressure acquiring portion 2 configured to acquire a pressure value of operating device air for the target valve; a stability-time detecting portion 3 configured to detect a stable-opening state in which a valve opening value acquired by the opening acquiring portion 1 becomes substantially constant; a frictional force detecting portion 4 configured to detect a difference between a maximum pressure value and a minimum pressure value of the operating device air in the stable-opening state as an index value indicating a frictional force at the sliding portion of the valve; a value lowering detecting portion 5 configured to detect remarkable lowering in which the index value lowers below a specified value; a lowering time difference calculating portion 6 configured, when the value lowering detecting portion 5 detects remarkable lowering of the index value, to calculate a time difference between a timing of occurrence of the remarkable lowering and a timing of occurrence of a previous remarkable lowering (time interval of occurrences of the remarkable lowering of the index value); a lowering time difference storing portion 7 configured to store the time difference calculated by the lowering time difference calculating portion 6; a time difference determining portion 8 configured to determine that an abnormality may have occurred in the valve in a case where an average value of a prescribed number of the time differences is smaller than a threshold; and an abnormality occurrence notifying portion 9 configured to notify an operator the fact that the an abnormality may have occurred in the valve.

The value lowering detecting portion 5, the lowering time difference calculating portion 6, the lowering time difference storing portion 7, and the time difference determining portion 8 constitute an abnormality determining portion configured to determine that an abnormality may have occurred in the valve in a case where the frequency of occurrence of the lowering in which the index value lowers below the specified value is an abnormal frequency.

Figure 3:
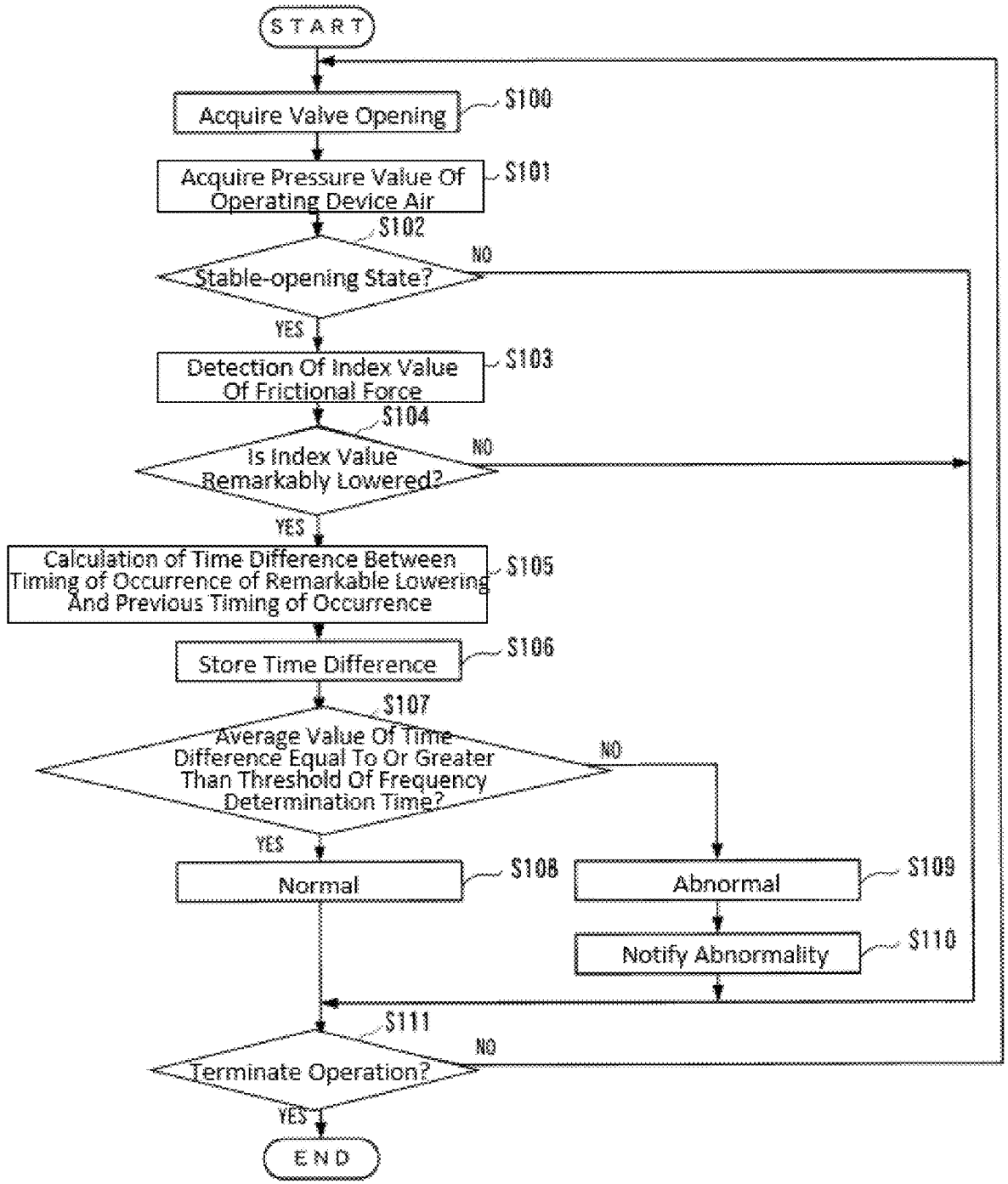
FIG. 3 is a flowchart explaining an operation of the valve abnormality detecting device according to the first embodiment of the present invention.

FIG. 3 is a flowchart for explaining an operation of the valve abnormality detecting device according to the present embodiment. The opening acquiring portion 1 acquires the valve opening value transferred from the target valve (not illustrated) to a DCS (Step S100 in FIG. 3). The valve opening may be acquired from the DCS via, for example, HART communication.

The valve or the positioner has a configuration to detect a valve opening position and provide a feedback to the DCS. The DCS transmits an opening indication value to the valve. The positioner (not shown) supplies a required air pressure to the operating device (not shown) of the valve so that the actual valve opening matches the opening indication value. The operating device operates the valve body by air pressure supplied from the positioner.

The pressure acquiring portion 2 acquires a pressure value Po1 of the operating device air, which is supplied from the positioner to the operating device for the target valve, from the pressure sensor provided on the operating device (Step S101 in FIG. 3).

Figure 4:
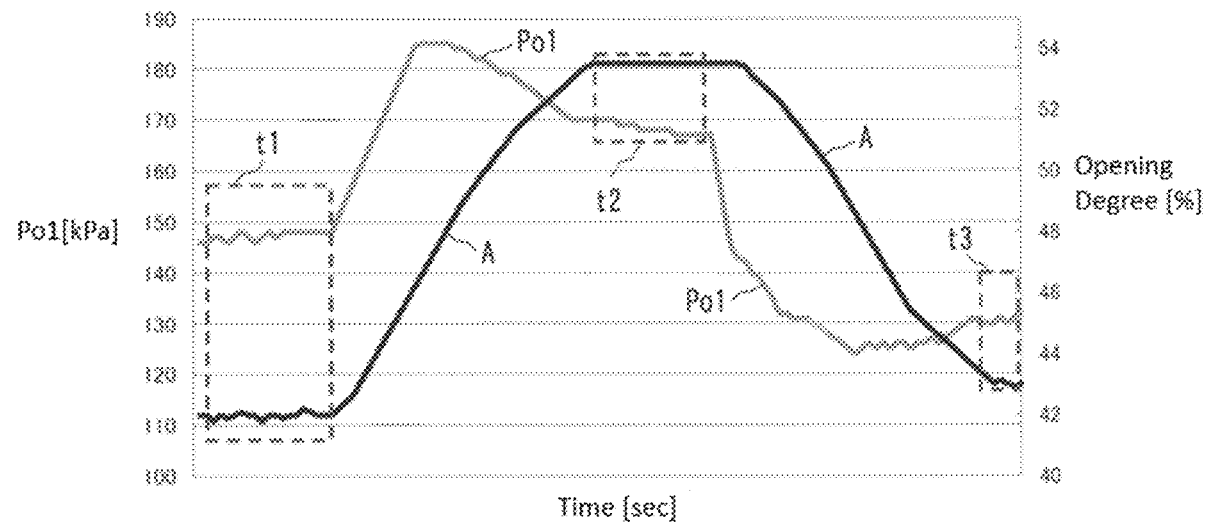
FIG. 4 is a drawing for explaining a stable-opening state.

The stability-time detecting portion 3 detects the stable-opening state in which a valve opening value acquired by the opening acquiring portion 1 becomes substantially constant (Step S102 in FIG. 3). Note that it is desirable that a case where the valve opening acquired from the DCS fluctuates only slightly due to a communication noise or the like is determined to be the stable-opening state. The stability-time detecting portion 3 determines that the valve is in the stable-opening state in a case where a change amount of the valve opening at each cycle of acquisition falls at or below a minimum specified value continues for a specified duration. For example, in the example illustrated in FIG. 4, the stable-opening state appears at three time zones t1, t2, and t3 where a valve opening A is substantially constant.

The frictional force detecting portion 4 detects a difference between the maximum pressure value Pomax and the minimum pressure value Pomin of operating device air (Pomax−Pomin) appearing repeatedly in the stable-opening state as an index value FI which indicates the frictional force at the sliding portion of the target valve (Step S103 in FIG. 3).

Figure 5:
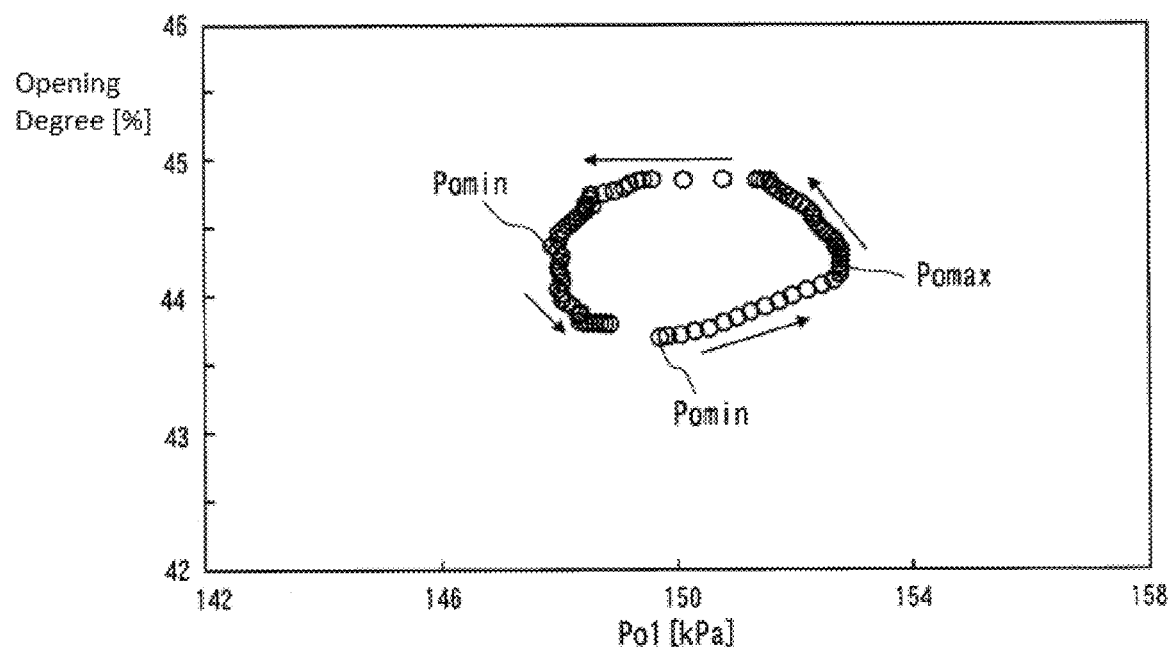
FIG. 5 is a drawing illustrating an example of a maximum pressure value and a minimum pressure value of operating device air detected in the stable-opening state.

FIG. 5 is a drawing for explaining the maximum pressure value Pomax and the minimum pressure value Pomin appearing repeatedly in the stable-opening state due to fluctuations of the pressure value Po1 of the operating device air. The example illustrated in FIG. 5 indicates that the maximum pressure values Pomax and the minimum pressure values Pomin appear alternately such as Pomin→Pomax→Pomin→ . . . because the pressure value Po1 changes in a direction indicated by arrows when the pressure value Po1 is periodically acquired in a state in which the valve opening is stable within a range from 43.5% to 45%.

The frictional force detecting portion 4 calculates the index value FI=Pomax−Pomin based on the latest maximum pressure value Pomax and the latest minimum pressure value Pomin every time when either the maximum pressure value Pomax or the minimum pressure value Pomin is detected.

The value lowering detecting portion 5 detects remarkable lowering in which the index value FI of the frictional force lowers below the specified value (Step S104 in FIG. 3). FIG. 5 described above illustrates a case where the fluctuation of the pressure value Po1 of the operating device air in the stable-opening state is slower than a cycle of acquisition of the pressure value Po1, and illustrates a case where the maximum pressure value Pomax and the minimum pressure value Pomin are detected without fail.

Figure 6:
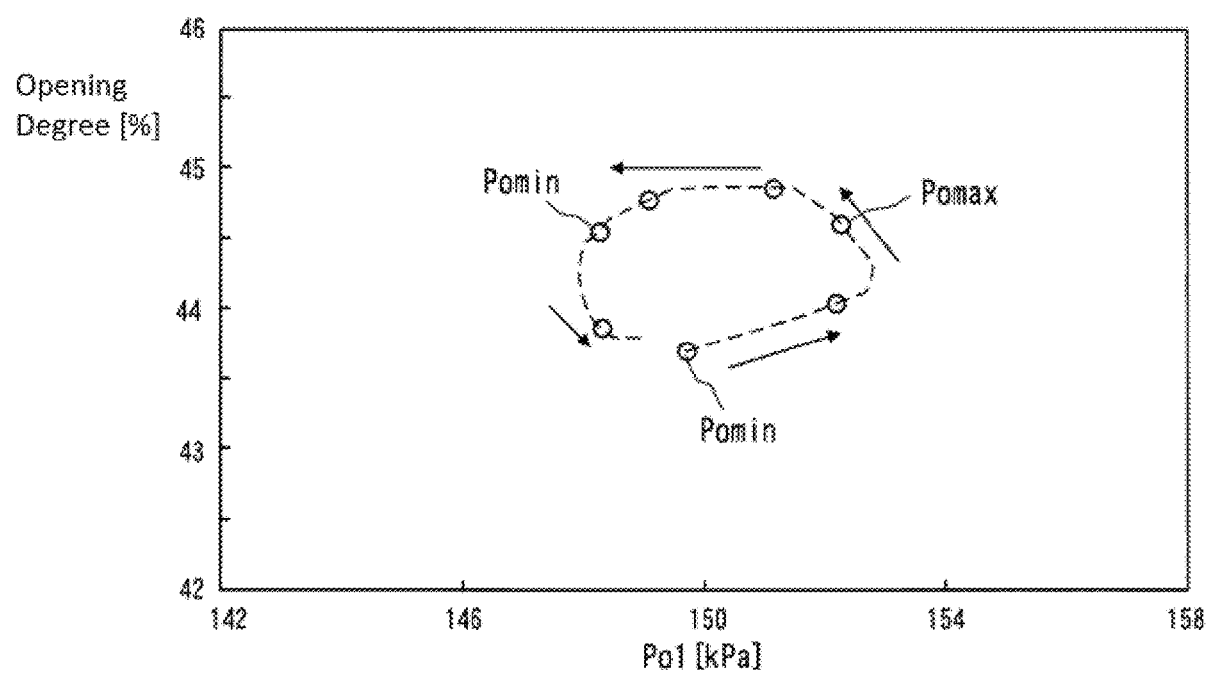
FIG. 6 is a drawing illustrating another example of the maximum pressure value and the minimum pressure value of the operating device air detected in the stable-opening state.

In contrast, when an abnormal phenomenon such as stick-slip of the valve occurs, the fluctuation of the pressure value Po1 is faster than the cycle of acquisition of the pressure value Po1 by the pressure acquiring portion 2, as illustrated in FIG. 6. When the fluctuation of the pressure value Po1 becomes faster, failure of detection of the maximum pressure value Pomax may occur, whereby the detected maximum pressure value Pomax may be lower than the actual value to be detected, or failure of detection of the minimum pressure value Pomin may occur, whereby the detected minimum pressure value Pomin may be higher than the actual value to be detected. Accordingly, remarkable lowering of the index value FI of the frictional force occurs. The value lowering detecting portion 5 detects such remarkable lowering.

When the value lowering detecting portion 5 detects remarkable lowering of the index value FI of the frictional force, the lowering time difference calculating portion 6 calculates a time difference TD between a timing of occurrence of the remarkable lowering and a timing of occurrence of a previous remarkable lowering (Step S105 in FIG. 3). The lowering time difference storing portion 7 stores the time difference TD calculated by the lowering time difference calculating portion 6 (Step S106 in FIG. 3).

The time difference determining portion 8 determines whether the target valve is normal based on the time difference TD stored in the lowering time difference storing portion 7. Specifically, the time difference determining portion 8 determines that the target valve is normal (Step S108 in FIG. 3) when an average value of n time differences TD (n is an integer of "2" or greater, for example, n=5) in total from the latest time difference TD up to the time difference TD which is (n−1) time differences TD before the latest time difference TD stored in the lowering time difference storing portion 7 is equal to or greater than the threshold of a frequency determination time specified in advance (Yes in Step S107 in FIG. 3), and determines that an abnormality may have occurred in the target valve (Step S109 in FIG. 3)

when the average value of the time differences TD is smaller than the threshold of the frequency determination time (No in Step S107).

When it is determined that an abnormality may have occurred in the target valve, the abnormality occurrence notifying portion 9 notifies an operator that an abnormality may have occurred (Step S110 in FIG. 3). Examples of a method of notification include displaying a message that notifies that an abnormality may have occurred, illuminating an LED or the like, and transmitting information indicating that an abnormality may have occurred to a host device.

The valve abnormality detecting device performs processes of Steps S100 to S110 at every certain time (for example, 50 msec), for example, until the operator gives an instruction to terminate the operation (Yes in Step S111 in FIG. 3).

In this manner, according to the present embodiment, the fault of the valve such as stick-slip may be detected at a timing closer to real-time than in the related art.

Figure 7A:
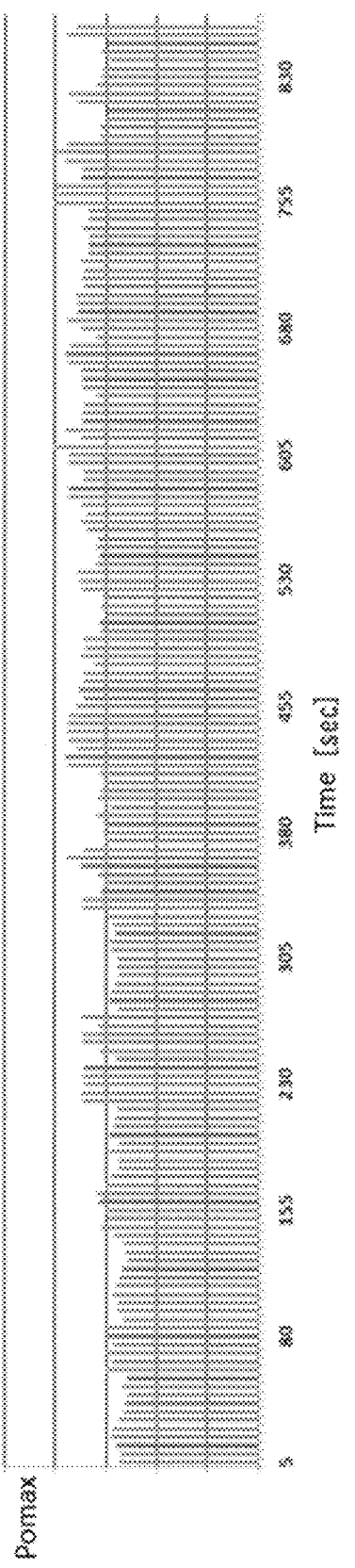
FIGS. 7A and 7B are drawings showing examples of the maximum pressure value of the operating device air and the index value of the frictional force, respectively.
Figure 7B:
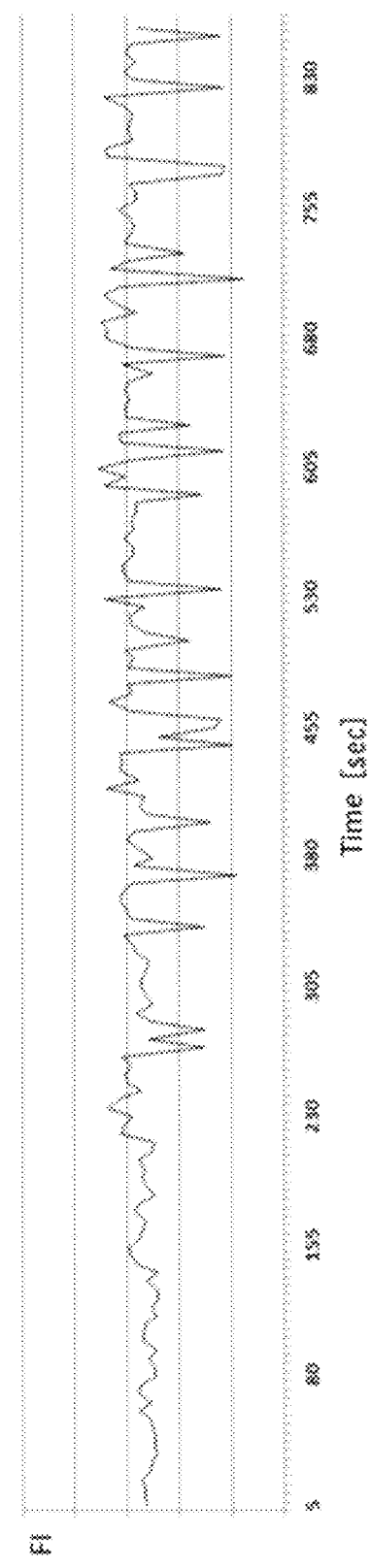

FIG. 7A is a drawing illustrating one example of the maximum pressure value Pomax of the operating device air, and FIG. 7B is a drawing illustrating one example of the index value FI of the frictional force calculated from the maximum pressure value Pomax illustrated in FIG. 7A and the minimum pressure value Pomin (not illustrated). Up to a time point near 260 sec in a first half, it shows a normal state without the remarkable lowering of the index value FI of the frictional force, and in the second half from 260 sec onward, it shows an abnormal state in which the remarkable lowering of the index value FI occurs frequently.

Note that in order to reduce a storage capacity of the lowering time difference storing portion 7, the number of the time differences TD that the lowering time difference storing portion 7 can store may be set to n, and the oldest time difference TD stored in the lowering time difference storing portion 7 may be overwritten by the latest time difference TD when the latest time difference TD is calculated by the lowering time difference calculating portion 6.

Second Embodiment

The frequency of the remarkable lowering of the index value FI of the frictional force may be determined by using the average value of n time differences TD in the first embodiment, but may be determined based on the number of times of occurrence of the remarkable lowering of the index value FI within a specified time.

Figure 8:
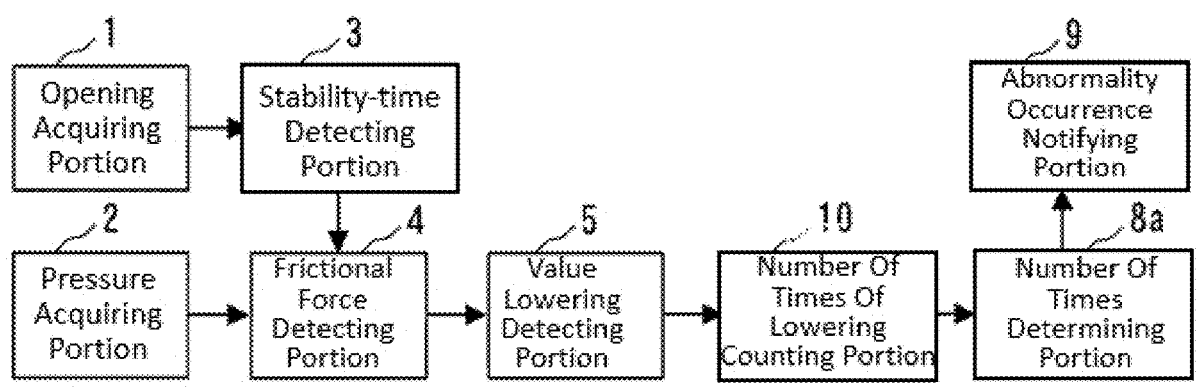
FIG. 8 is a block diagram illustrating a configuration of a valve abnormality detecting device according to a second embodiment of the present invention.

FIG. 8 is a block diagram illustrating a configuration of a valve abnormality detecting device according to the present embodiment. The valve abnormality detecting device of the present embodiment comprises: the opening acquiring portion 1, the pressure acquiring portion 2, the stability-time detecting portion 3, the frictional force detecting portion 4, the value lowering detecting portion 5, a number of times determining portion 8a configured to determine that an abnormality may have occurred in the valve in a case where the number of times of occurrence of the remarkable lowering of the index value within the prescribed time exceeds the threshold; the abnormality occurrence notifying portion 9; and the number of times of lowering counting portion 10 configured to count the number of times of occurrence of the remarkable lowering of the index value. The value lowering detecting portion 5, the number of times determining portion 8a, and the number of times of lowering counting portion 10 constitute the abnormality determining portion.

Figure 9:
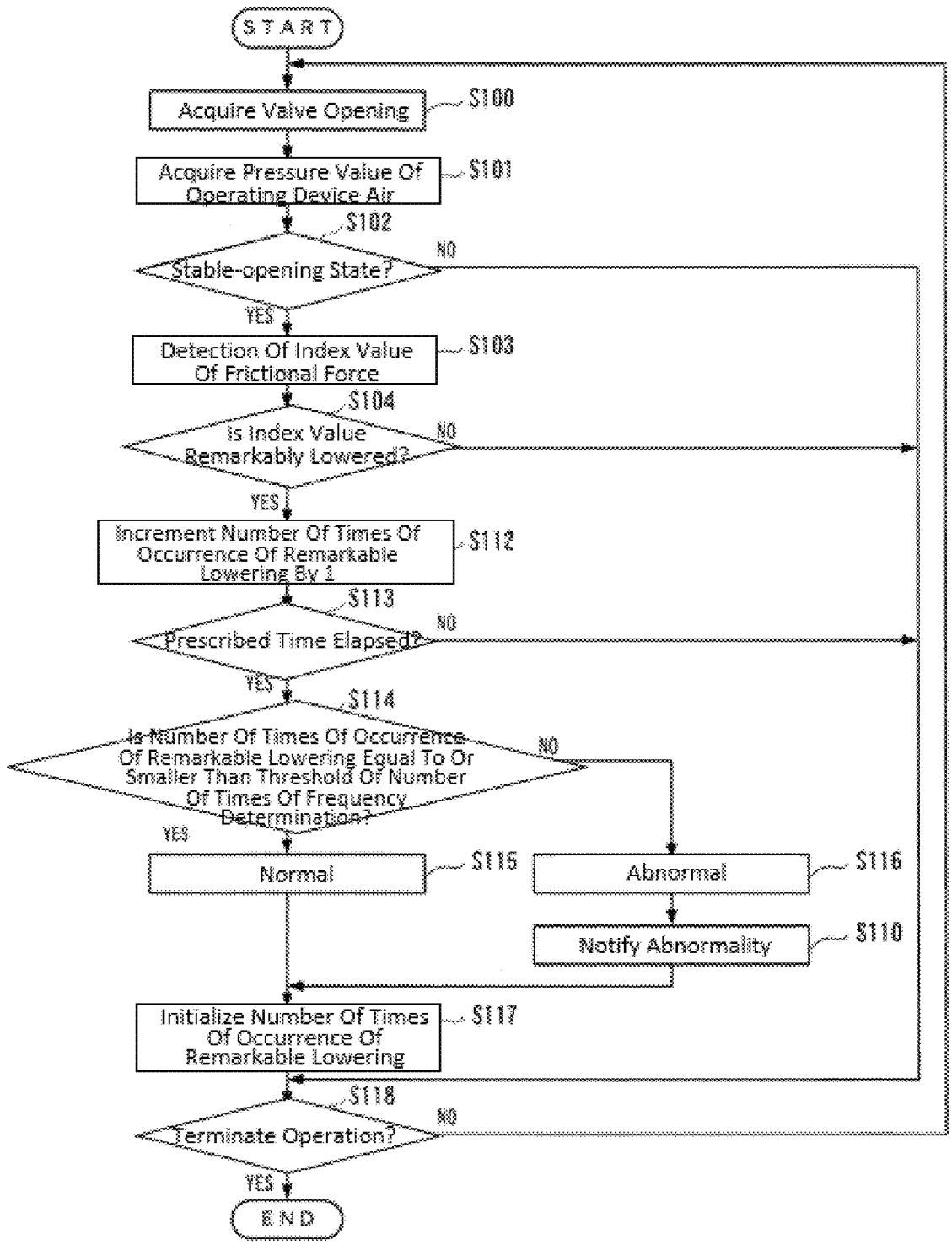
FIG. 9 is a flowchart explaining an operation of the valve abnormality detecting device according to the second embodiment of the present invention.

FIG. 9 is a flowchart for explaining the operation of the valve abnormality detecting device according to the present embodiment. Operations of the opening acquiring portion 1, the pressure acquiring portion 2, the stability-time detecting portion 3, the frictional force detecting portion 4, and the value lowering detecting portion 5 (Steps S100 to S104 in FIG. 9) are as described in conjunction with the first embodiment.

The number of times of lowering counting portion 10 increments the number of times of occurrence of the remarkable lowering N by "1" when the remarkable lowering of the index value FI of the frictional force is detected by the value lowering detecting portion 5 (Step S112 in FIG. 9). An initial value of the number of times of occurrence N is "0".

The number of times determining portion 8a determines whether the target valve is normal based on the number of times of occurrence of the remarkable lowering of the index value FI of the frictional force. Specifically, the number of times determining portion 8a determines whether an elapsed time from a time point of the previous determination reaches the prescribed time (5 minutes, for example) (YES in Step S113 in FIG. 9), determines that the target valve is normal (Step S115 in FIG. 9) in a case where the number of times of occurrence N of the remarkable lowering of the index value FI is equal to or smaller than the threshold of the number of times of frequency determination (Yes in Step S114 in FIG. 9) when the prescribed time is reached, and determines that an abnormality may have occurred in the target valve (Step S116 in FIG. 9) in a case where the number of times of occurrence N exceeds the threshold of the number of times of frequency determination (No in Step S114).

The operation of the abnormality occurrence notifying portion 9 (Step S110 in FIG. 9) is as described in the first embodiment.

After the determination is terminated, the number of times determining portion 8a initializes the counted value of the number of times of lowering counting portion 10 to "0" (Step S117 in FIG. 9).

The valve abnormality detecting device performs processes of Steps S100 to S104, S110, S112 to S117 at every certain time (for example, 50 msec), for example, until the operator gives an instruction to terminate the operation (Yes in Step S118 in FIG. 9).

In this manner, in the present embodiment, the same effect as the first embodiment may be achieved.

Figure 10:
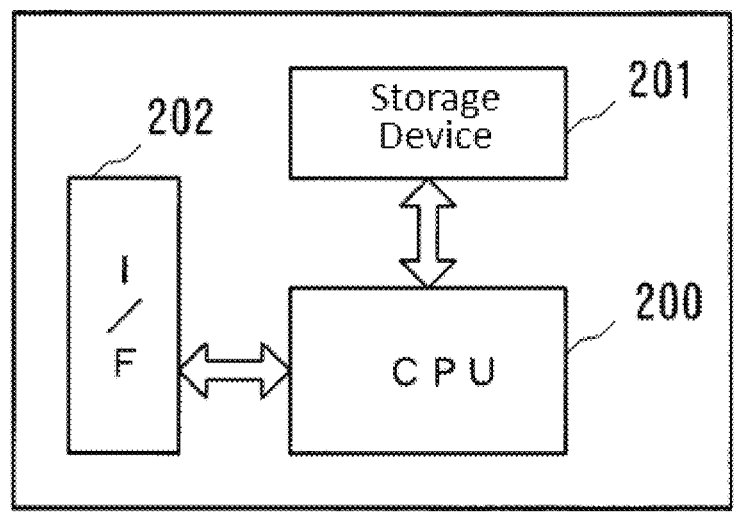
FIG. 10 is a block diagram illustrating a configuration example of a computer which realizes the valve abnormality detecting device according to the first and second embodiments of the present invention.
Figure 11:
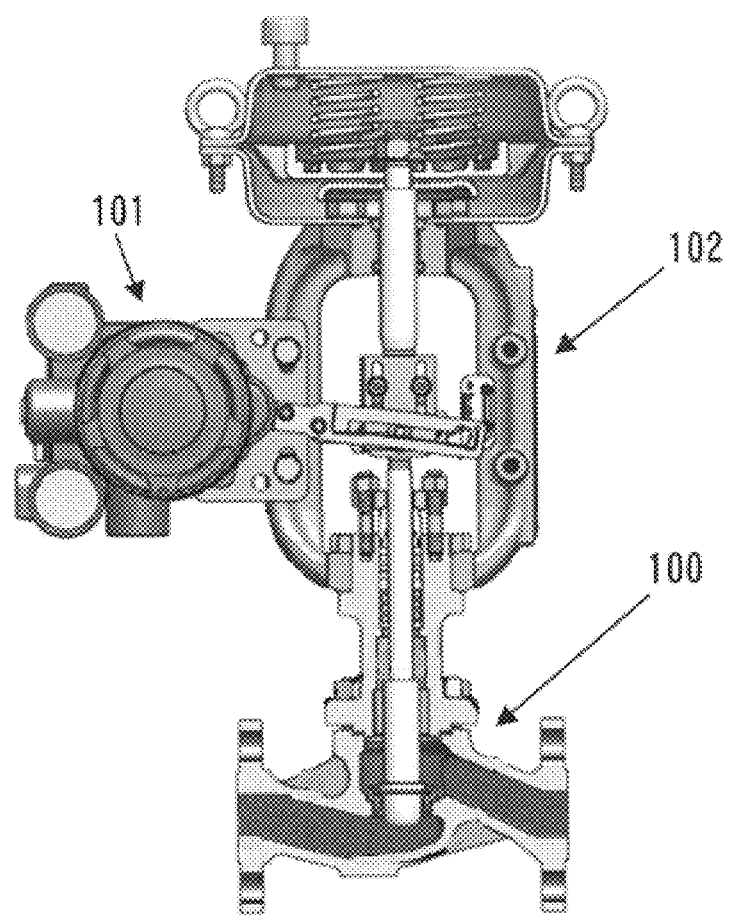
FIG. 11 is a drawing illustrating an example of a control valve.
Figure 12:
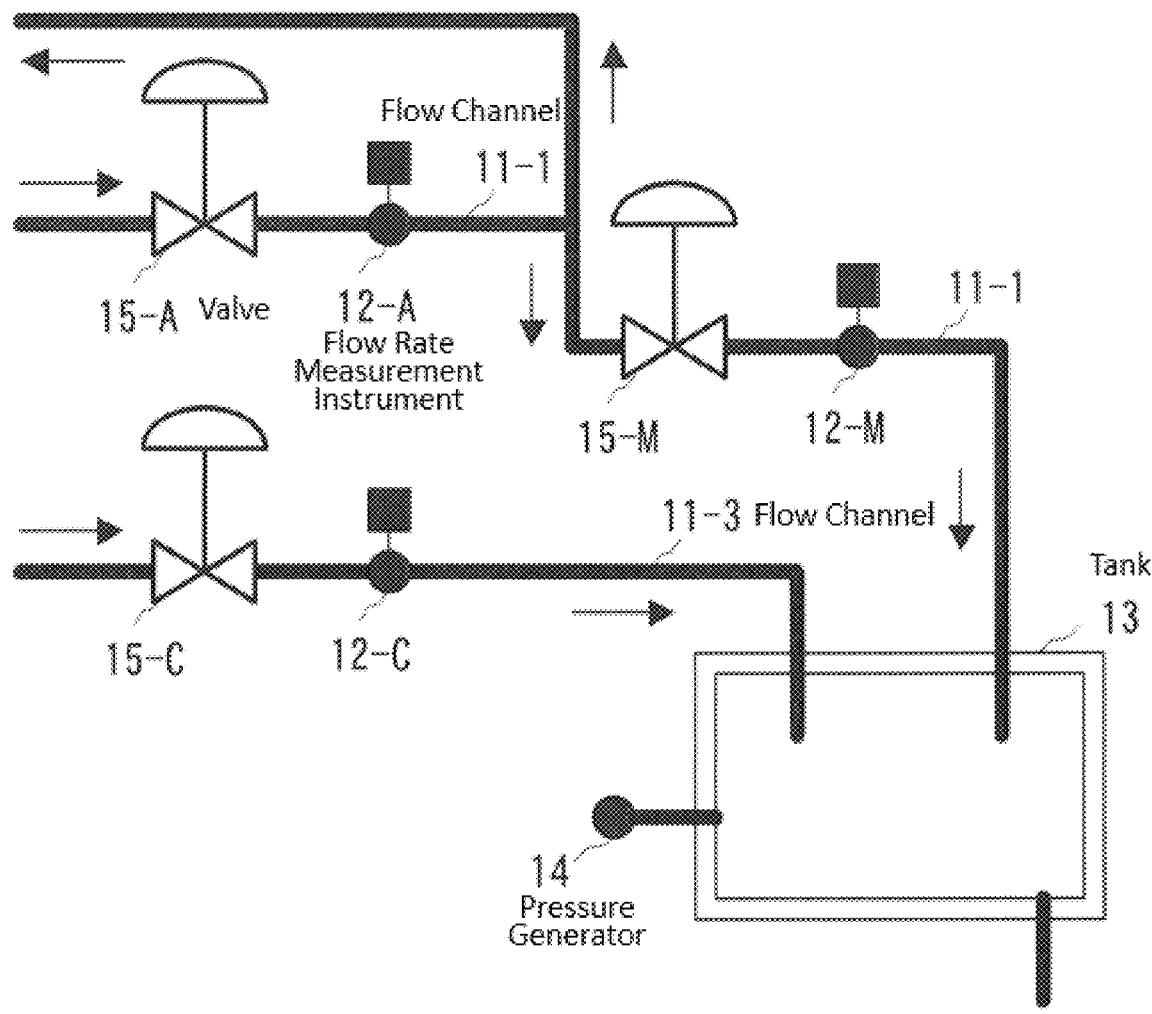
FIG. 12 is a drawing illustrating an example of a plurality of valves used in a tank of a plant.

The valve abnormality detecting device described in the first and second embodiments can be implemented by a computer including a Central Processing Unit (CPU), a storage device, and an interface, and a program configured to control these hardware resources. A configuration example of the computer is illustrated in FIG. 10.

The computer comprises a CPU 200, a storage device 201, and an interface device (hereinafter abbreviated as I/F) 202. The pressure sensor, the DCS, and the like are connected to the I/F 202. In such a computer, a program for causing the computer to implement the valve abnormality detecting method according to the present invention is stored in the storage device 201. The CPU 200 executes the processing described in the first and second embodiments in accordance with the program stored in the storage device 201.

INDUSTRIAL APPLICABILITY

The present invention may be applied to technology for detecting an abnormality of a valve.

DESCRIPTION OF REFERENCE NUMERALS AND SIGNS 1 opening acquiring portion
2 pressure acquiring portion
3 stability-time detecting portion
4 frictional force detecting portion
5 value lowering detecting portion
6 lowering time difference calculating portion
7 lowering time difference storing portion
8 time difference determining portion
8a number of times determining portion
9 abnormality occurrence notifying portion
10 number of times of lowering counting portion

What is claimed is:

1. A valve abnormality detecting device, comprising:
an opening acquiring portion configured to acquire a valve opening value for each of a plurality of acquisition cycles;
a pressure acquiring portion configured to acquire a pressure value of operating device air supplied from a positioner to an operating device for a valve;
a stability-time detecting portion configured to detect a stable-opening state in which a change amount of the valve opening value acquired by the opening acquiring portion over consecutive acquisition cycles of the plurality of acquisition cycles covering a specified duration falls at or below a specified minimum value;
a frictional force detecting portion configured to detect a difference between a maximum pressure value and a minimum pressure value of the operating device air in the stable-opening state as an index value indicating a frictional force at a sliding portion of the valve; and
an abnormality determining portion configured to determine that an abnormality may have occurred in the valve in a case where a frequency of occurrence of reduction in which the index value falls below a specified value is an abnormal frequency.

2. The valve abnormality detecting device according to claim 1, wherein the abnormality determining portion comprises:
a value lowering detecting portion configured to detect a remarkable lowering in which the index value lowers below the specified value;
a lowering time difference calculating portion configured, when a remarkable lowering of the index value is detected by the value lowering detecting portion, to calculate a time difference between a timing of occurrence of the remarkable lowering and a timing of occurrence of a previous remarkable lowering;
a lowering time difference storing portion configured to store the time difference calculated by the lowering time difference calculating portion; and
a time difference determining portion configured to determine that an abnormality may have occurred in the valve in a case where an average value of a predetermined number of the time differences is smaller than a threshold.

3. The valve abnormality detecting device according to claim 1, wherein the abnormality determining portion comprises:
a value lowering detecting portion configured to detect a remarkable lowering in which the index value lowers below the specified value;
a number of times of lowering counting portion configured to count a number of times of occurrence of the remarkable lowering of the index value; and
a number of times determining portion configured to determine that an abnormality may have occurred in the valve in a case where the number of times of occurrence of the remarkable lowering of the index value in a prescribed time exceeds a threshold.

4. The valve abnormality detecting device according to claim 1, further comprising an abnormality occurrence notifying portion configured to notify an operator that an abnormality may have occurred in the valve.

5. A valve abnormality detecting method, comprising:
acquiring a valve opening value for each of a plurality of acquisition cycles;
acquiring a pressure value of operating device air supplied from a positioner to an operating device for a valve;
detecting a stable-opening state in which a change amount of the acquired valve opening value over consecutive acquisition cycles of the plurality of acquisition cycles covering a specified duration falls at or below a specified minimum value;
detecting a difference between a maximum pressure value and a minimum pressure value of the operating device air in the stable-opening state as an index value indicating a frictional force at a sliding portion of the valve;
calculating a frequency of occurrence of reduction in which the index value falls below a specified value; and
determining that an abnormality may have occurred in the valve in a case where the calculated frequency is an abnormal frequency.

6. The valve abnormality detecting method according to claim 5, wherein the frequency calculating comprises:
detecting a remarkable lowering in which the index value lowers below the specified value;
calculating a time difference between a timing of occurrence of the remarkable lowering and a timing of occurrence of a previous remarkable lowering and storing the time difference; and
calculating an average value of a specified number of the time differences; and
the abnormality determining comprises:
determining that an abnormality may have occurred in the valve in a case where the calculated average value is smaller than a threshold.

7. The valve abnormality detecting method according to claim 5, wherein the frequency calculating comprises:
detecting a remarkable lowering in which the index value lowers below the specified value; and
counting a number of times of occurrence of the remarkable lowering of the index value in a prescribed time; and
the abnormality determining comprises:
determining that an abnormality may have occurred in the valve in a case where the counted number exceeds a threshold.

8. The valve abnormality detecting method according to claim 5, further comprising: notifying an operator that an abnormality may have occurred in the valve.

* * * * *